(12) United States Patent
Miyata

(10) Patent No.: US 8,651,523 B2
(45) Date of Patent: Feb. 18, 2014

(54) AIRBAG, AIRBAG APPARATUS AND VEHICLE

(75) Inventor: Yasuhito Miyata, Minato-ku (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 13/593,434

(22) Filed: Aug. 23, 2012

(65) Prior Publication Data
US 2013/0056967 A1 Mar. 7, 2013

Related U.S. Application Data

(63) Continuation-in-part of application No. 12/641,716, filed on Dec. 18, 2009, now Pat. No. 8,308,187.

(30) Foreign Application Priority Data

Sep. 1, 2011 (JP) .................................. 2011-190812

(51) Int. Cl.
B60R 21/233 (2006.01)
(52) U.S. Cl.
USPC .......................... 280/743.1; 280/732; 280/729

(58) Field of Classification Search
USPC ....................................... 280/743.1, 732, 729
See application file for complete search history.

(56) References Cited

FOREIGN PATENT DOCUMENTS

JP 2006-103654 4/2006
JP 2010-0274901 12/2010

Primary Examiner — Drew Brown
(74) Attorney, Agent, or Firm — Foley & Lardner LLP

(57) ABSTRACT

An airbag includes: a base chamber; a left-half airbag inflated on a front-left side of the passenger, wherein a first opening is formed at an upper portion, and a second opening is formed at a lower portion; and a right-half airbag inflated on a front-right side of the passenger wherein a first opening is formed at an upper portion, and a second opening is formed at a lower portion. A first seam joining the left-half airbag and the right-half airbag is formed to surround the first openings, and a second seam joining the left-half airbag and the right-half airbag is formed to surround the second openings. The first seam is located above an entrance line along which a top of a head of a small passenger enters the airbag and is substantially parallel with the entrance line.

13 Claims, 6 Drawing Sheets

AIRBAG, AIRBAG APPARATUS AND VEHICLE

This application is a continuation-in-part of U.S. patent application Ser. No. 12/641,716 (now U.S. Pat. No. 8,308,187), filed on Dec. 18, 2009. This application also claims priority to Japanese Patent Application No. 2011-190812, filed on Sep. 1, 2011, which is incorporated by reference herein.

BACKGROUND

1. Technical Field

The present invention relates to an airbag and an airbag apparatus for restraining a driver or a passenger inside a vehicle when, for example, it collides with another object. More particularly, the invention relates to an airbag which has a left-half airbag and a right-half airbag and comes to have a vertical recess in the surface, opposed to the driver or passenger, of the airbag when inflated, as well as an airbag apparatus which is equipped with such an airbag. The invention also relates to a vehicle which is equipped with such an airbag apparatus.

2. Related Art

JP-A-2006-103654 discloses an airbag for restraining a driver or a passenger inside a vehicle when, for example, the vehicle collides with another object in which a vertical recess is formed in its surface that is opposed to the driver or passenger when inflated. Paragraph 0039 of this document has a passage to the effect that when the vehicle collides with a front object, the shoulders of the driver or passenger are restrained by shoulder restraining portions, located on both sides of the recess, of the airbag as inflated and his or her head is restrained by the airbag as it goes into the recess.

The present invention relates to an airbag in which a vertical recess is formed in its surface that is opposed to the driver or passenger and his or her head is restrained by the airbag as it goes into the recess when the air bag is inflated, and in which, in particular, his or her head is restrained by the airbag as it goes relatively deep into the recess, an airbag apparatus which is equipped with such an airbag, and a vehicle which is equipped with such an airbag apparatus.

SUMMARY

According to one or more illustrative aspects of the present invention, there is provided an airbag which is inflated rearward from an instrument panel of a vehicle to come close a passenger seated in a passenger seat. The airbag includes: a base chamber which is disposed at a front side of the vehicle; a left-half airbag which is continuous with the base chamber and is inflated on a front-left side of the passenger, wherein a first opening is formed through the left-half airbag at an upper portion thereof, and a second opening is formed through the left-half airbag at a lower portion thereof; and a right-half airbag which is continuous with the base chamber and is inflated on a front-right side of the passenger wherein a first opening is formed through the right-half airbag at an upper portion thereof, and a second opening is formed through the left-half airbag at a lower portion thereof. A recess is formed between the left-half airbag and the right-half airbag so as to face the passenger, when the airbag is inflated in front of the passenger. The first opening of the left-half airbag and the first opening of the right-half airbag are communicated with each other, and the second opening of the left-half airbag and the second opening of the right-half airbag are communicated with each other. A first seam joining the left-half airbag and the right-half airbag is formed to surround the first openings of the left-half airbag and the right-half airbag, and a second seam joining the left-half airbag and the right-half airbag is formed to surround the second openings of the left-half airbag and the right-half airbag. The first seam is located above an entrance line along which a top of a head of a small passenger enters the airbag and is substantially parallel with the entrance line.

In the airbag according to the invention, upper portions of the left-half airbag and the right-half airbag communicate with each other through the first openings and lower portions of the left-half airbag and the right-half airbag communicate with each other through the second openings. Portions around the first openings of the left-half airbag and the right-half airbag are sewed together, and portions around the second openings of the left-half airbag and the right-half airbag are sewed together. In a state that the airbag is inflated, a vertical recess is formed in the surface that is opposed to the passenger. When the vehicle collides with a front object, the head of the passenger is received by the airbag as it goes into the recess formed in the surface that is opposed to the passenger. The right-half airbag and the left-half airbag receive the right chest and the left chest of the passenger, respectively. The ribs which are hard and strong exist in each of the right chest and the left chest. The airbag receives the passenger using his or her ribs and thereby absorbs the kinetic energy of the passenger. The breastbone (located at the center of the chest of the passenger) and its neighborhood face the recess. Therefore, when the passenger body is received by the airbag, the breastbone and its neighborhood do not receive very strong reaction force from the airbag. That is, the force acting on the breastbone and its neighborhood is reduced.

In the invention, the portion, located under the first openings, of the first seam is located above the entrance line of the head top of a small passenger, and extends approximately parallel with the entrance line. Therefore, the head top of a small passenger does not interfere with the first seam and goes relatively deep into a recess that is formed under the first openings. The kinetic energy of the passenger is thus absorbed.

If the vehicle which incorporates the airbag apparatus according to the invention collides with another object in a state that a passenger is seated in the passenger seat in such a manner that a larger part of his or her weight is supported by one side portion (e.g., left-side portion) of the passenger seat, the passenger is mainly received by the left-hand room of the airbag and the pressure of the left-hand room is made higher than that of its right-hand room. Part of the gas existing in an upper portion of the left-hand room flows into the right-hand room through the openings, whereby the force acting on the head of the passenger is reduced. The same advantage is obtained also in a case that a passenger is seated in the passenger seat in such a manner that a larger part of his or her weight is supported by a right-side portion of the passenger seat.

In the invention, the formation of the first openings and the second openings provides another advantage that the left-half airbag and the right-half airbag are inflated and developed equally, whereby the internal pressure of the left-half airbag is made equal to that of the right-half airbag.

Since the horizontal distance between the third seam and passenger-side tips of the airbag is longer than 100 mm (e.g., 100 to 350 mm) in a state that the airbag has been inflated completely, the head goes deep into the recess.

Since the rear end of the instrument panel and the third seam is longer than or equal to 190 mm, an object existing in the vicinity of the instrument panel is inserted into a cavity of the airbag formed between the rear end of the instrument panel and the third seam when the airbag is inflated.

Where the top portion of the second seam is located in front of the top of the breastbone of a small passenger in a state that the airbag according to the invention has been inflated completely, increase of the left-right interval between the left-half airbag and the right-half airbag is prevented or suppressed when chest portions on both sides of the breastbone are restrained by the airbag.

DETAILED DESCRIPTION

Figure 1:
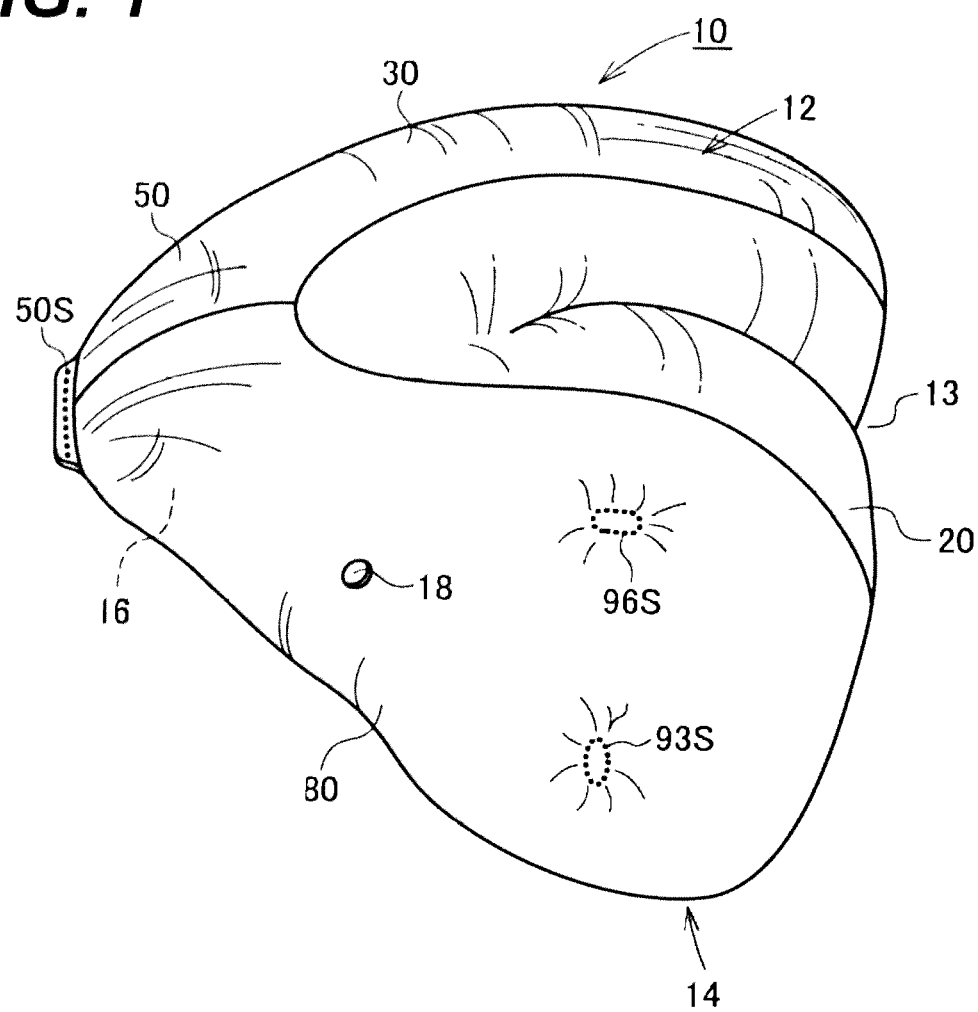
FIG. 1 is a perspective view of an airbag according to an embodiment.

Exemplary embodiments of the present invention will be hereinafter described with reference to the drawings.

As shown in FIGS. 1-4, an airbag 10 has a right-half airbag 12 which is inflated on the front-right of a passenger, a left-half airbag 14 which is inflated on the front-left of the passenger, and a base chamber 16 which communicates with proximal portions of the right-half airbag 12 and the left-half airbag 14. Confronting walls of the right-half airbag 12 and the left-half airbag 14 are sewed together to form seams 91S and 92S.

The right-half airbag 12 and the left-half airbag 14 communicate with each other through first openings 91 and second openings 92 which are formed in their confronting walls. The first openings 91 and the second openings 92 are formed at an upper position and a lower position of the airbag 10, respectively. A preferable aperture area range of the first openings 91 is approximately 7,500 to 50,000 mm$^2$, and an even preferable range is approximately 20,000 to 40,000 mm$^2$. A preferable aperture area range of the second openings 92 is approximately 1,200 to 31,400 mm$^2$, and an even preferable range is approximately 1,900 to 20,000 mm$^2$. The openings 91 of the right-half airbag 12 and the left-half airbag 14 are placed on each other and portions around them are sewed together to form a first seam (sewing portion) 91S. The openings 92 of the right-half airbag 12 and the left-half airbag 14 are placed on each other and portions around them are sewed together to form a second seam (sewing portion) 92S. The seams 91S and 92S extend so as to surround the openings 91 and the openings 92, respectively.

Figure 6:
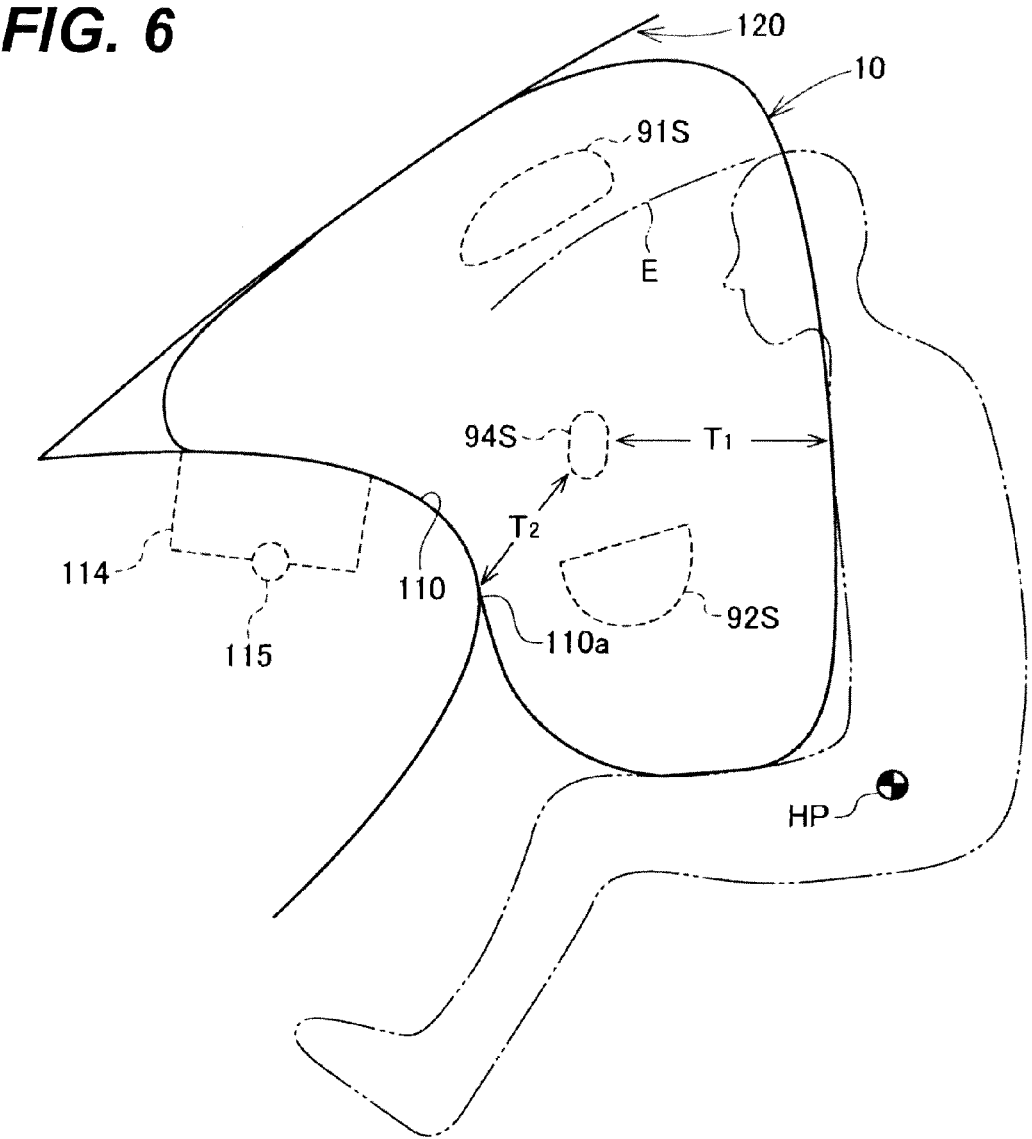
FIG. 6 is a side view of the airbag of FIG. 1 that is inflated.

The first openings 91 have a long and narrow shape and, as shown in FIG. 6 which is a side view as viewed from the direction that is perpendicular to the front-rear direction, the longitudinal direction of the first openings 91 is approximately parallel with a windshield 120 in a state that the top surface of the airbag 10 as inflated completely is in contact with the windshield 120.

The bottom edges of the first openings 91 and the seam 91S located under those bottom edges are located above a head entrance line E of a small passenger and extend approximately parallel with the head entrance line E. The entrance line E is a movement locus along which the top of the head of an AF05 test dummy is rotated forward with a hip point HP as a rotation center when the vehicle collides with a front object. In the specification, the AF05 test dummy stands for a legally regulated crash test dummy in the U.S. for a small-sized adult female in 5 percentile. A preferable range of the minimum interval $d_2$ between the seam 91S and the entrance line E is approximately 10 to 80 mm, and an even preferable range is approximately 30 to 60 mm. If the minimum interval $d_2$ is too long, the position of the first openings 91 may be too high.

Figure 3A:
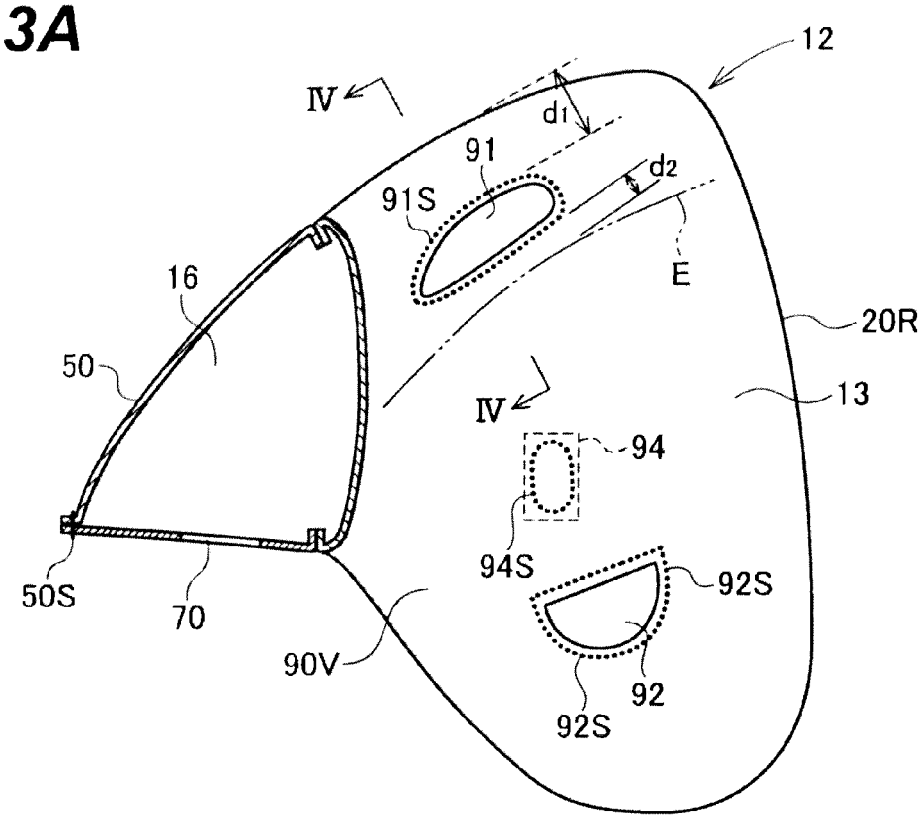
FIG. 3A is a sectional view taken along line in FIG. 2
Figure 3B:
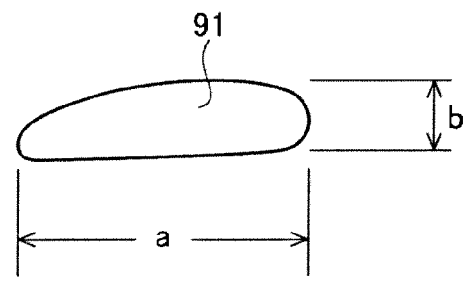
FIG. 3B is a side view of a first opening.

As shown in FIG. 3B, in an uninflated state, a preferable range of the ratio a/b of the longitudinal length a of the first openings 91 to their maximum width b in the direction perpendicular to the longitudinal direction is about 2.0 to 10.0 and an even preferable range is about 2.5 to 6.5. A preferable range of the length a is about 100 to 380 mm, and an even preferable range is about 120 to 280 mm. A preferable range of the length b is about 10 to 190 mm, and an even preferable range is about 20 to 110 mm.

In an inflation-completed state, the seam 92S is located in front of the chest of the above-mentioned passenger.

In an inflation-completed state, the surface, opposed to the passenger, of the airbag 10 and its top surface are formed with a continuous recess 13 between the right-half airbag 12 and the left-half airbag 14.

Figure 2:
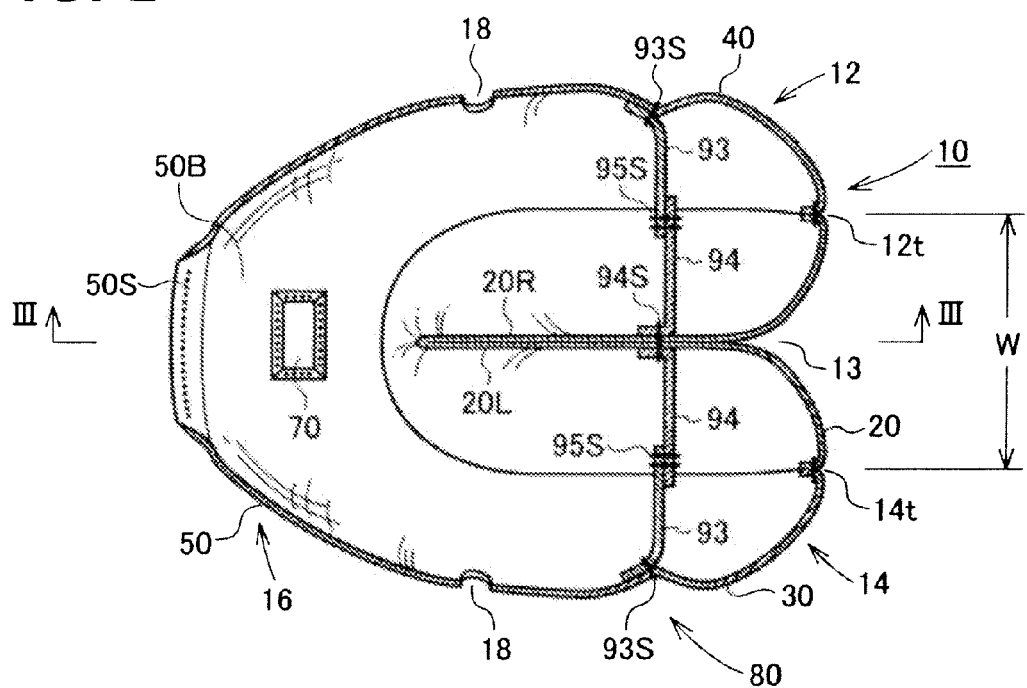
FIG. 2 is an approximately horizontal sectional view of the airbag of FIG. 1.

Referring to FIG. 2, it is preferable that in an inflation-completed state the interval W between a tip 12$t$, on the passenger side, of the right-half airbag 12 and a tip 14$t$, on the passenger side, of the left-half airbag 14 be 150 to 450 mm. It is even preferable that the interval be 170 to 430 mm.

Referring to FIG. 3A, it is preferable that in a state that the airbag 10 is inflated completely but is not in contact with the windshield 120, the instrument panel, the passenger, or the like, the minimum depth of that part (valley portion) of the recess 13 which is formed in the top surface of the airbag 10 as measured from the top surface of the airbag 10, that is, the shortest distance $d_1$ between the top surface of the airbag 10 and the seam 91S be 5 to 80 mm. It is even preferable that the shortest distance $d_1$ be 10 to 50 mm.

In the embodiment, as shown in FIG. 2, tethers 93 and 94 are formed in each of the right-half airbag 12 and the left-half airbag 14 at a position that is near the center of the right-half airbag 12 or the left-half airbag 14 in the top-bottom direction and the front-rear direction so as to extend in the left-right direction of the airbag 10. The tethers 93 and 94 restrict the left-right width of each of the right-half airbag 12 and the left-half airbag 14 when the airbag 10 is inflated, whereby the capacity of each of the right-half airbag 12 and the left-half airbag 14 is reduced and use of an inflater having a small output power is thereby enabled. Furthermore, since the tethers 93 and 94 restrict the interval W between the tip 12$t$ of the right-half airbag 12 and the tip 14$t$ of the left-half airbag 14, the ribs of the passenger is restrained by the right-half airbag 12 and the left-half airbag 14 and the load on his or her breastbone is thereby reduced.

The pairs of tethers 93 and 94 are sewed on the inside walls of the right-half airbag 12 and the left-half airbag 14, respectively, to form a seam 94S. The seam 94S serves to join the inside walls of the right-half airbag 12 or the left-half airbag 14 to each other. It is preferable that in an inflation-completed state the horizontal distance $T_1$ between the seam 94S and the tips 12$t$ and 14$t$ be 100 to 350 mm. An even preferable range of the horizontal distance $T_1$ is 150 to 250 mm.

Figure 4:
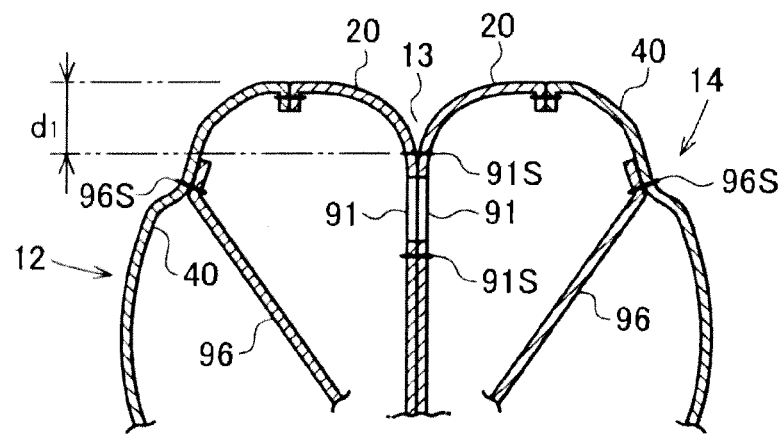
FIG. 4 is a sectional view taken along line IV-IV in FIG. 3A.

In the embodiment, as shown in FIG. 4, each tether 96 is formed so as to pull inward an upper portion of the outer side wall of the right-half airbag 12 or the left-half airbag 14 of the airbag 10 as inflated. This is to prevent interference between the airbag 10 as inflated and the A pillar. Reference symbol 96S denotes a seam that joins a tether 96 to the right-half airbag 12 or the left-half airbag 14.

A vent 18 is formed through the outer side wall of each of the right-half airbag 12 and the left-half airbag 14.

The panel configuration of the airbag 10 will be described below with reference to FIG. 5, which is an exploded perspective view in which the airbag 10 is disassembled into individual panels.

The outer shell of the airbag 10 is composed of an inside panel 20 and an outside panel 80.

The inside panel 20 is a long and narrow, generally gourd-shaped panel. As shown in FIG. 5, the inside panel 20 is folded at the center to form a right side portion 20R and a left side portion 20L. The right-side portion 20R serves as the inner side wall of the right-half airbag 12 and the left side portion 20L serves as the inner side wall of the left-half airbag 14. The overall perimeter of the inside panel 20 consists of a bottom sideline 28, a tip sideline 21, and a top sideline 22 of the left side portion 20L, a top side line 23 near the folding portion, a top sideline 24, a tip sideline 25, and a bottom sideline 26 of the right side portion 20R, and a bottom sideline 27 near the folding portion.

The outside panel 80 has a right outer wall 40 which serves as the outer side wall of the right-half airbag 12, a left outer wall 30 which serves as the outer side wall of the left-half airbag 14, and a mouth wall structure 50 which serves to form the base chamber 16.

The outer circumferential edge of the left outer wall 30 consists of a tip sideline 31, a top sideline 32, and a bottom sideline 34, and the outer circumferential edge of the right outer wall 40 consists of a tip sideline 41, a top sideline 42, and a bottom sideline 44.

The mouth wall structure 50 has a left side wall 50A, a bottom wall 50B, a right side wall 50C, a left flap 50D which serves as a top left side portion, and a right flap 50E which serves as a top right side portion. A proximal portion of the left outer wall 30 is continuous with the left side wall 50A, and a proximal portion of the right outer wall 40 is continuous with the right side wall 50C. Each of the side walls 50A and 50C is generally triangular, and the mouth wall structure 50 is open on the rear side.

The mouth wall structure 50 has, as outer edges, confronting sidelines 51 and 52 of the generally rectangular flaps 50D and 50E, rear sidelines (flap rear sidelines) 53 and 54 of the flaps 50D and 50E, front sidelines 55 and 56 of the flaps 50D and 50E, a front sideline 57 which is opposed to the front sidelines 55 and 56, and a rear sideline (bottom rear sideline) 60 of the bottom wall 50B.

The flap rear sidelines 53 and 54 are continuous with the top sidelines 32 and 42 of the left outer wall 30 and the right outer wall 40, respectively. The bottom sideline 60 is continuous with the bottom sidelines 34 and 44 of the left outer wall 30 and the right outer wall 40.

To allow the insides of the left-half airbag 14 and the right-half airbag 12 to communicate with each other, the first openings 91 are formed through the left side portion 20L and the right side portion 20R of the inside panel 20 at upper positions and the second openings 92 are formed through the left side portion 20L and the right side portion 20R of the inside panel 20 at lower positions.

As shown in FIG. 2, the seam 94S is formed at a position between the openings 91 and the openings 92 so as to join proximal end portions of the tethers 94 to the left side portion 20L and the right side portion 20R, respectively.

As shown in FIG. 2, a seam 93S is formed at such a position as to face the distal end of the associated tether 94 so as to join a proximal end portion of a tether 93 to the left outer wall 30 or the right outer wall 40 of the outside panel 80. Likewise, as partly shown in FIGS. 1 and 4, proximal end portions of each pair of tethers 96 are sewed on the inside panel 20 and the outside panel 80.

Figure 5:
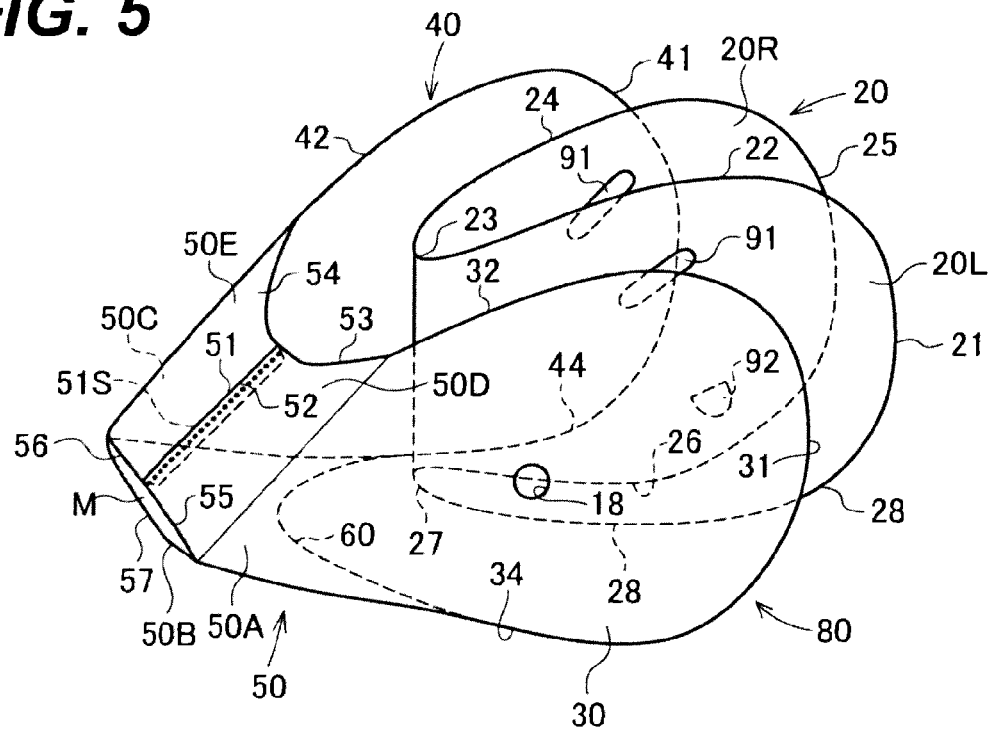
FIG. 5 is an exploded perspective view of the airbag of FIG. 1.

The tethers 93, 94, and 96 are not shown in FIG. 5 to clarify the panel configuration of the airbag 10.

As shown in FIGS. 2 and 3, a mouth 70 which is an opening for introduction of gas supplied from an inflater 115 (see FIG. 6) is formed through the bottom wall 50B of the outside panel 80 at the center in the left-right direction.

To manufacture the airbag 10, first, as shown in FIG. 5, portions, adjacent to the confronting sidelines 51 and 52, of the flaps 50D and 50E of the mouth wall structure 50 are sewed together to form a seam 51S.

Then, the inside panel 20 is folded into two parts so that its left side portion 20L and right side portion 20R are placed on each other, and the left side portion 20L and right side portion 20R are sewed together to form seams 91S and 92S around the openings 91 and the openings 92, respectively. Then, the left outer wall 30 of the outside panel 80 is opposed to the left side portion 20L of the inside panel 20. And portions adjacent to the tip sidelines 21 and 31 are sewed together, portions adjacent to the top sidelines 22 and 32 are sewed together, and portions adjacent to the bottom sidelines 28 and 34 are sewed together. Likewise, the right outer wall 40 of the outside panel 80 is opposed to the right side portion 20R of the inside panel 20. And portions adjacent to the tip sidelines 25 and 41 are sewed together, portions adjacent to the top sidelines 24 and 42 are sewed together, and portions adjacent to the bottom sidelines 26 and 44 are sewed together. Portions adjacent to the flap rear sidelines 53 and 54 of the mouth wall structure 50 of the outside panel 80 are sewed on a portion adjacent to the top sideline 23 of the inside panel 20, and a portion adjacent to the bottom rear sideline 60 of the mouth wall structure 50 is sewed on a portion adjacent to the bottom sideline 27 of the inside panel 20. Then, as shown in FIG. 2, distal end portions of each pair of tethers 93 and 94 are sewed together to form a seam 95S. Likewise, distal end portions of each pair of tethers 96 are sewed together.

The above-described sewing work produces an airbag in process that is inside out, that is, the sewing margins are exposed to the outside of the airbag in process. As shown in FIG. 5, in the mouth wall structure 50, in this state, portions adjacent to the flap front sidelines 55 and 56 have not been sewed on a portion adjacent to the front sideline 57 to leave an open mouth M.

Then, the airbag in process is reversed through the open mouth M and the open mouth M is closed by forming a seam 50S (see FIGS. 1 and 2). The airbag 10 shown in FIG. 1 is thus completed.

As shown in FIG. 2, the mouth 70 for introduction of gas supplied from the inflater 115 (see FIG. 6) is formed through the bottom wall 50B of the base chamber 16.

The airbag 10 can be sewed easily because its outer shell is composed of the two panels 20 and 80.

The airbag 10 is mounted in a passenger-side airbag apparatus to restrain a person seated in the passenger seat of a vehicle at the occurrence of a vehicle collision.

As shown in FIG. 6, the passenger-side airbag apparatus is equipped with a case (container) 114 which houses the airbag 10, the inflater 115 for inflating the airbag 10, etc. all of which are disposed in an instrument panel 110. The inflater 115 is disposed in the case 114. The airbag 10 which is folded up is housed in the case 114. The case 114 is provided with a lid so that the folded airbag 10 is covered with the lid. When the airbag 10 is inflated, the lid is cloven being pressed by the inflating airbag 10. In FIG. 6, reference numeral 120 denotes the windshield.

How the airbag apparatus operates will be described below.

When a vehicle that is mounted with the airbag apparatus collides with another object, the inflater 115 gushes out gas. The gas inflates the base chamber 16 and then flows into the right-half airbag 12 and the left-half airbag 14 to inflate them.

In the airbag 10, the base chamber 16 inflates first between the instrument panel 110 and the windshield 120 so as to keep its posture stable. As a result, the postures of the right-half airbag 12 and the left-half airbag 14 are also kept stable not only after completion of the inflation but also during the inflation.

Gas is supplied to the right-half airbag 12 and the left-half airbag 14 approximately equally from the base chamber 16 that has inflated. Furthermore, since tip-side portions of the right-half airbag 12 and the left-half airbag 14 communicate with each other through the first openings 91 and the second openings 92, the right-half airbag 12 and the left-half airbag 14 can inflate smoothly and approximately equally from an initial stage of the inflation. If the openings 91 and 92 were not formed, the internal pressures of the right-half airbag 12 and the left-half airbag 14 would become different from each other and hence they would inflate unequally and would possibly be developed unstably. The openings 91 and 92 prevent the right-half airbag 12 and the left-half airbag 14 from being developed unequally or behaving violently during inflation.

When the airbag 10 has been inflated completely, the recess 13 is formed at the center in the left-right direction so as to extend from the surface that is opposed to the passenger to the top surface. In the surface that is opposed to the passenger, a valley-shaped recess (part of the recess 13) is formed between the right-half airbag 12 and the left-half airbag 14 so as to extend in the vertical direction and to face the passenger.

If the passenger is seated at the center of the passenger seat in the left-right direction, when the airbag 10 is inflated, the head of the passenger goes into that portion of the recess 13 which is formed in the surface that is opposed to the passenger and the head is received by the airbag 10 so as to he sandwiched between the right-half airbag 12 and the left-half airbag 14. The kinetic energy of the head is thus absorbed. The inflated right-half airbag 12 and left-half airbag 14 receive the right chest and the left chest of the passenger, respectively, and the above portion of the recess 13 faces his or her breastbone and its neighborhood. Therefore, the force acting on the breastbone when the passenger receives the airbag 10 is reduced.

Figure 7A:
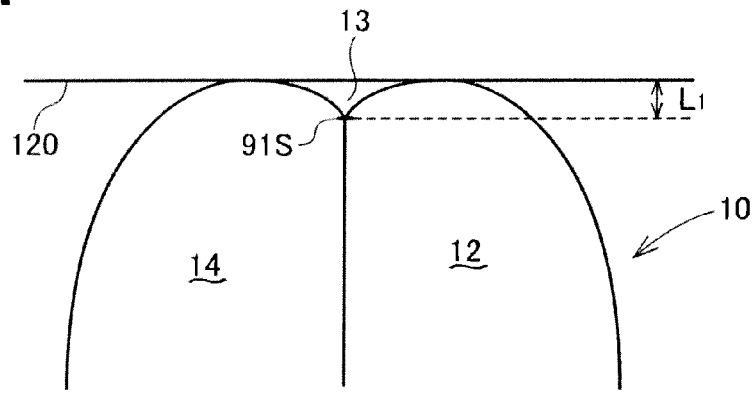
FIGS. 7A-7C illustrate the characteristics of the airbag of FIG. 1 through comparison with another airbag.

In the embodiment, the depth $d_1$ (see FIG. 3A) of that portion (valley portion) of the recess 13 which is formed in the top surface over the first openings 91 is small. More specifically, since the first openings 91 extend approximately in the vehicle front-rear direction, when gas pressure acts so as to push up the valley portion of the recess 13 because of inflation of the airbag 10, the vertical width of the first openings 91 is increased to a large extent and the depth $d_1$ of the valley portion is made small. FIG. 7A schematically shows how the top surface of the airbag 10 touches the windshield 120.

Figure 7B:
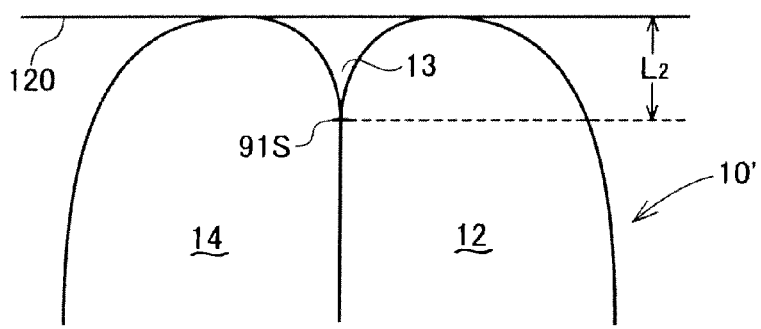

If an airbag 10' in which the opening area of the first openings 91 is the same as in the airbag 10 but its front-rear length is shorter than its vertical width were inflated in the same manner as the airbag 10, as shown in FIG. 7B a deep valley portion would be formed in the recess 13 because the upward expansive deformation of those portions of the inside panel 20 which are located in front of and behind the first openings 91 would be restricted when the airbag 10 is inflated.

Figure 7C:
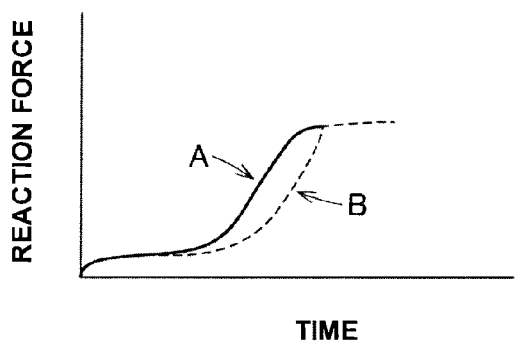

In the airbag 10 in which the recess 13 has a shallow valley portion (see FIG. 7A), when the airbag 10 which is receiving the passenger is pressed against the windshield 120, the bottom of the valley portion (i.e. the top portion of the seam 91S) immediately comes into contact with or close to the windshield 120 because the distance $L_1$ between the bottom of the valley portion and the windshield 120 is small. The contact area of the airbag 10 and the windshield 120 is increased and hence the forward movement of the surface that is opposed to the passenger is restricted. As a result, after the start of restraint of the passenger, the reaction force acting on the passenger rises earlier as indicated by line A in FIG. 7C.

In contrast, in the airbag 10' in which the recess 13 has a deep valley portion (see FIG. 7B), after the start of restraint of the passenger, the airbag 10' needs to move more than the airbag 10 (see FIG. 7A) until the bottom of the valley portion (i.e., the top portion of the seam 91S) comes into contact with or close to the windshield 120 because the distance $L_2$ between the bottom of the valley portion and the windshield 120 is large. Therefore, after the start of restraint of the passenger by the airbag 10', the reaction force rises later as indicated by line B in FIG. 7C.

In the airbag 10 according to the invention, the passenger restraining performance is improved because the reaction force at an initial stage of restraint of a passenger is increased.

In the embodiment, as shown in FIG. 3A, a vertically extending cavity 90V exists between the base chamber 16 and the seams 92S and 94S and between the right-half airbag 12 and the left-half airbag 14. The cavity 90V is formed so that at least part of its lower opening is located in the rear of a rearmost portion 110a of the instrument panel 110 (see FIG. 6) when the airbag 10 has been inflated completely. That is, when the airbag 10 has been inflated completely, at least part of the lower opening of the cavity 90V is exposed in the bottom surface of the airbag 10 in the rear of the rearmost portion 110a of the instrument panel 110. Therefore, even if a certain object exists in the vicinity of the instrument panel 110 when the airbag 10 is inflated, the object is inserted into the cavity 90V. It is preferable that the distance $T_2$ between the rearmost portion 110a of the instrument panel 110 and the seam 94S be longer than or equal to 190 mm.

Although in the embodiment the right-half airbag 12 and the left-half airbag 14 are symmetrical with each other, they may be asymmetrical with each other. The right-half airbag 12 and the left-half airbag 14 may be either identical or different in capacity.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An airbag which is inflated rearward from an instrument panel of a vehicle to come to close a passenger seated in a passenger seat, the airbag comprising:

a base chamber which is disposed at a front side of the vehicle;

a left-half airbag which is continuous with the base chamber and is inflated on a front-left side of the passenger, wherein a first opening is formed through the left-half airbag at an upper portion thereof, and a second opening is formed through the left-half airbag at a lower portion thereof; and a right-half airbag which is continuous with the base chamber and is inflated on a front-right side of the passenger wherein a first opening is formed through the right-half airbag at an upper portion thereof, and a second opening is formed through the left-half airbag at a lower portion thereof, wherein a recess is formed between the left-half airbag and the right-half airbag so as to face the passenger, when the airbag is inflated in front of the passenger, wherein the first opening of the left-half airbag and the first opening of the right-half airbag are communicated with each other, and the second opening of the left-half airbag and the second opening of the right-half airbag are communicated with each other, wherein a first seam joining the left-half airbag and the right-half airbag is formed to surround the first openings of the left-half airbag and the right-half airbag, and a second seam joining the left-half airbag and the right-half airbag is formed to surround the second openings of the left-half airbag and the right-half airbag, and wherein the first seam is located above an entrance line along which a top of a head of an AF05 test dummy enters the airbag and is substantially parallel with the entrance line.

2. The airbag according to claim 1, wherein the left-half airbag comprises a first tether extending in a right-left direction of the left-half airbag so as to restrict a left-right width of the left-half airbag, and the right-half airbag comprises a second tether extending in a right-left direction of the right-half airbag so as to restrict a left-right width of the right-half, wherein the first tether is provided between the first opening and the second opening of the left-half airbag, and the second tether is provided between the first opening and the second opening of the right-half airbag, wherein a third seam is provided to join the left-half airbag, the first tether, the right-half airbag and the second tether, and a distance between the third seam and a surface of the airbag which is the closest to the passenger is in a range of 100 mm to 350 mm, when the airbag is completely inflated.

3. The airbag according to claim 1, wherein a top portion of the second seam is located in front of the top of a breastbone of the AF05 test dummy, when the airbag is completely inflated.

4. An airbag apparatus comprising:
the airbag according to claim 1;
a retainer which houses the airbag which is folded up therein; and
an inflator configured to inflate the airbag.

5. A vehicle comprising the airbag apparatus according to claim 4.

6. The airbag according to claim 1, wherein the entrance line is a movement locus along which the top of the head of the AF05 test dummy is rotated forward as a rotation center when the vehicle collides with a front object.

7. The airbag according to claim 1, wherein a distance between the entrance line and first seam is between approximately 10 and 80 millimeters.

8. The airbag according to claim 7, wherein a distance between the entrance line and first seam is between approximately 30 and 60 millimeters.

9. The airbag according to claim 1, wherein the first openings have a length in a longitudinal direction and a width perpendicular to the longitudinal direction, and a ratio between the length and width is between approximately 2 and 10.

10. The airbag according to claim 9, wherein the ratio between the length and width of the first openings is between approximately 2.5 and 6.5.

11. The airbag according to claim 1, wherein the first openings have a length in a longitudinal direction between approximately 100 and 380 millimeters and have a width perpendicular to the longitudinal direction between approximately 10 and 190 millimeters.

12. The airbag according to claim 11, wherein the length of the first openings is between approximately 120 and 280 millimeters and the width of the first openings is between approximately 20 and 110 millimeters.

13. The airbag according to claim 1, wherein the first seam and the entrance line do not intersect.

\* \* \* \* \*